United States Patent [19]

Bolto et al.

[11] 4,115,297

[45] Sep. 19, 1978

[54] THERMALLY REGENERABLE AMPHOTERIC ION EXCHANGERS PREPARED BY SEQUENTIAL TREATMENT OF POLYMERIC BEADS WITH TWO REAGENTS OF OPPOSING ACID BASE CHARACTER

[75] Inventors: Brian Alfred Bolto, Mitcham; Kurt Hermann Eppinger, East Bentleigh, both of Australia

[73] Assignees: ICI Australia Limited; Commonwealth Scientific and Industrial Research Organization, both of Australia

[21] Appl. No.: 676,345

[22] Filed: Apr. 12, 1976

[30] Foreign Application Priority Data

May 12, 1975 [AU] Australia ............................ PC1560

[51] Int. Cl.$^2$ ........................... B01J 1/08; C08F 28/00
[52] U.S. Cl. ............................................ 521/32; 260/9;
521/33; 526/37; 526/46; 526/52.2; 526/52.5
[58] Field of Search ......... 260/17 R, 2.1 R, 79.5 NV, 260/2.2 R

[56] References Cited

U.S. PATENT DOCUMENTS

| | | | |
|---|---|---|---|
| 3,278,487 | 10/1966 | Kun | 260/79.5 NV |
| 3,634,394 | 1/1972 | Andreassen | 260/2.1 R |
| 3,816,356 | 6/1974 | Grannen et al. | 260/2.2 C |
| 3,821,126 | 6/1976 | Yamanoto et al. | 260/2.2 R |
| 3,892,688 | 7/1975 | Motani et al. | 260/79.5 NV |
| 3,892,689 | 7/1975 | Motani et al. | 260/79.5 NV |

OTHER PUBLICATIONS

Chemical Abstracts, vol. 69, Entry – 36677q, 1968.
Chemical Abstracts, vol. 73– Entry 67251L, 1970.
Chemical Abstracts, vol. 66, Entry 19471p.

*Primary Examiner*—Joseph L. Schofer
*Assistant Examiner*—Peter F. Kulkosky
*Attorney, Agent, or Firm*—Cushman, Darby & Cushman

[57] ABSTRACT

A method of manufacturing amphoteric resins. Polymeric beads are treated sequentially with two reagents of opposite acid/base character. The resins are useful in the desalination of water.

6 Claims, No Drawings

THERMALLY REGENERABLE AMPHOTERIC ION EXCHANGERS PREPARED BY SEQUENTIAL TREATMENT OF POLYMERIC BEADS WITH TWO REAGENTS OF OPPOSING ACID BASE CHARACTER

This invention relates to amphoteric resins and to methods of manufacture of amphoteric resins.

We have found a new method of manufacturing amphoteric resins in which the ratio of basic and acidic sites in the resin are substantially independent and in which internal neutralization in the resin is reduced.

Accordingly we provide a process of manufacturing an amphoteric resin wherein a polymer which contains either acidic groups or basic groups or precursors of acid or basic groups is treated with a reagent containing eith basic or acidic groups respectively so that the network of the polymer is substituted with basic or acidic groups.

In a further aspect of our invention the initial polymer containing either acidic or basic groups is prepared by treating beads of a neutral polymer with a reagent containing either acid or basic groups so that the network of the polymer is substituted with acidic or basic groups respectively.

The neutral polymer should contain sites which are reactive towards the reagents containing the acidic and basic groups, and may or may not be crosslinked in its initial form.

Suitable neutral polymers are for example polymers and copolymers of chlormethylated polystyrene, polyvinyl chloride, polyvinylidine chloride, chlorinated polyethylene and chlorinated rubbers and other polymers containing a reactive chloro group.

Other neutral polymers are for example, polyvinyl alcohol, polysaccharides of many types such as e.g. cellulose or dextran. When using chlorinated neutral polymers typical reagents containing acid groups for example are thioglycolic, thiolactic, thiomalic and thiosalicyclic acids, and the analogous hydroxyacids.

Suitable reagents containing basic groups are primary and secondary amines of the alkyl and arylalkyl types, polyamines such as $NH_2(CH_2CH_2NH)_nH$ with $n = 1$ to 4 and derivatives thereof in which one amino group is in the primary or secondary form, with the others in primary, secondary or tertiary form, analogous cyclic diamines and 2-amino-, 2-alkylamino-, and 2-dialkylaminoethane thiols.

When using hydroxylated neutral polymers typical reagents containing acid groups, for example, are chloracetic, 2-chloropropionic and 3-chlorobutyric acids and the analogous bromo compounds, whilst suitable reagents containing basic groups are 2-amino-, 2-alkylamino, 2-dialkylaminoethyl chlorides and $\alpha, \omega$-amino acids.

Alternatively, a neutral polymer can be employed which contains groups which are precursors for either acidic or basic groups. The desired proportion of the neutral groups is converted to groups of the opposite character, either basic or acidic, by a suitable reaction. In a separate reaction, the residual precursor groups are converted to their parent functionality.

Suitable neutral polymers, which may or may not be crosslinked, are for example, the simple esters or amides and acid chlorides or acid anhydrides of polyacrylic and polymethacrylic acids, and the simple aliphatic amides of primary or secondary polyamines such as polyethylenimine, poly-N-alkylethylenimines, polyaminoethyl acrylate or methacrylate, polyalkylaminoethyl acrylate or methacrylate, polydiallylamine, polyvinylamine, and polyvinyl-N-alkylamines.

Suitable reagents containing basic groups, for reaction with neutral polymers containing precursors for acidic groups are diamines of the types mentioned heretofore, in which at least one amino group is of the primary or secondary type and is capable of forming an amide link to the neutral polymer by reaction with some of the precursor groups. The residual precursor groups are converted to carboxylic acid groups by a simple standard reaction such as alkaline hydrolysis.

Suitable reagents containing acidic groups, for reaction with neutral polymers containing precursors for basic groups include the mono acid chloride, ester, or amide derivative of dicarboxylic acids such as oxalic, malonic, succinic and adipic acids and the like, which are capable of reacting with some of the precursor groups to form an amine linkage. The remaining precursor groups are converted to amino groups by hydrolysis, although in this instance it will be appreciated that the use of a precursor derivative of the polyamine is not essential, and the desired structures may be obtained from the parent polyamine by reacting a proportion of the amino groups with one of the aforementioned reagents.

These preferred reagents yield amphoteric resins having thermally regenerable ion-exchange properties.

Thermally regenerable resins have a potentially important application in water demineralisation processes because low-grade heat can be efficiently employed for regeneration and certain of these resins are of use in the desalination of water by the so-called "Sirotherm" process. "Sirotherm" is a Trade Mark of ICI Australia for thermally regenerable ion exchange resins.

The "Sirotherm" process, is described in the publications: "The 'Sirotherm' Demineralisation Process — an Ion Exchange Process with Thermal Regeneration", part 1. J. Inst. Engr. Aust. (1965) 37, 193;

"An Ion Exchange Process with Thermal Regeneration", Aust. J. Chem (1966), 19, 561 (Part 11) 589 (Part (III), 765 (Part IV) and 791 (Part V).

"Thermally Regenerated Ion Exchange Process — An Aid to Water Management", J. Water Poll. Control Fed (1966), 38, 1782; and Australian Pat. No. 274,029.

Polymeric compositions having suitable ion-exchange properties for the "Sirotherm" process have a molar ratio of amine groups to acid groups in the range from 10 : 90 to 90 : 10 preferably from 20 : 80 to 60 : 40.

The product of our process comprises beads of roughly the same size as the neutral polymer beads used as starting material. Therefore the size of the product may be controlled by controlling the size of the neutral polymer beads. For example beads for the manufacture of ion-exchange resins used in large scale ion-exchange columns are in the size range from 200 mesh B.S.S. to 10 mesh B.S.S., and preferably 52 mesh B.S.S. to 14 mesh B.S.S.

It is preferable to subject the product resin to a pH equilibration treatment to achieve the optimum ion-exchange performance. Normally, this simply involves stirring the resin in an aqueous salt solution at room temperature (ca. 20° C.) and adding sodium hydroxide to the acidic form until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in Australian Pat. No. 274,029. For purposes of evaluation, however, the resin may be washed with hot water at ca. 80° C. to obtain it in a regenerated form, and the amount of salt taken up by stirring the regenerated resin in salt solution at room temperature used as a measure of the thermally regenerable capacity of the system. The time necessary to achieve salt uptake equivalent to 50% of the equilibrium level (the "half time") may be used as a convenient measure of the rate of salt adsorption.

Finally, it will be appreciated that the amphoteric resins formed in accordance with the present invention must differ from the prior art amphoteric resins where self-neutralisation must involve association of oppositely charged sites which, from the steric or structural standpoint, defines a resin which is significantly different from one where self-neutralisation has been prevented because the sites are no longer randomly disposed within the structure but because of the method of manufacture it can be postulated that the amphoteric resins of our invention are in the form of concentric shells of ion exchange material surrounding a central core of inert material. We in no way are bound by this postulate.

The ion-exchange capacity of the product produced by our process depends to a great extent on the reagents used.

Suitable combinations of reagents to give a desired ion-exchange capacity may be found by simple experiment.

The invention is now illustrated by, but by no means limited to, the following Examples:

EXAMPLE 1

Polystyrene beads of a macroporous type, crosslinked with divinylbenzene (8% w/w on total monomers) and chloromethylated to a nominal degree of substitution of unity, were stirred in dioxane for 1 hr. to swell the particles of beads (30 g in 300 ml of swelling agent). Thioglycolic acid (98%, 9.3 ml) was added, together with a solution of sodium hydroxide (10.8 g) in methanol (250 ml) and water (50 ml). The mixture was gently stirred at 50° C. for 6 days, after which the resin was removed by filtration, and added to a solution of diethylamine (50 ml) in dioxane (300 ml). Mild agitation was continued for 6 days at 50° C. After the first day, a solution of sodium hydroxide (16 g) in water (50 ml) was added. The product was washed in a column with 0.3 N sodium hydroxide solution, 2N hydrochloric acid and, and finally water, using 20 bed volumes of each.

The acid form was treated with an excess of alkali, and by titration of the unreacted alkali, and measurement of the chloride ion released, the resin was found to contain 2.46 meq/g of carboxylic acid groups and 0.48 meq/g of amine hydrochloride groups. The ratio of acidic to basic sites was thus 5.1.

Samples of the resin were equilibrated to different pH levels in 100 mg/l sodium chloride solution, then thermally regenerated with distilled water at 80° C., using a column. Salt uptakes from 0.02N sodium chloride were then measured to give the following results:

| pH | Salt uptake |
| --- | --- |
| 4.6 | 0.18 meq/g |
| 5.0 | 0.20 |
| 5.2 | 0.20 |
| 5.5 | 0.20 |
| 6.0 | 0.09 |
| 6.5 | 0.06 |
| 7.0 | 0.04 |

A range of other products were prepared using the conditions summarized in Table 1. The acidic and basic capacities, the acid/base site ratio, and the salt uptake by thermally regenerated samples equilibrated to pH 5.5 are given in Table 2.

TABLE 1

Summary Of Preparative Details For Double Reacted Resins Based On Chloromethylated Crosslinked Polystyrene

| Resin No. | Step 1 (Vol. in ml) | Step 2 (Vol. in ml) | Wt. of beads used (g) Step 1/Step 2 |
| --- | --- | --- | --- |
| 1 | TGA (9.3) | HNEt$_2$ (50) | 30.0/all |
| 2 | HNEt$_2$ (7.3) | TGA (18.6) Simultaneous | 30.0/all |
| 3 | (7.3) | (11.2) | 30.0/all |
| 4 | HNEt$_2$ (3.4) | TGA (9.9) | 15.7/all |
| 5 | TGA (3.7) | H$_2$NMe 13.7) | 13.1/8.5 |
| 6 | TGA (3.7) | HNMe$_2$ (20) | 13.1/9.0 |
| 7 | TGA (6.5) | HNMe$_2$ (20) | 13.1/12.3 |
| 8 | TGA (5.6) | HNMe$_2$ (20) | 13.1/8.9 |
| 9 | TGA (4.8) | HNMe$_2$ (20) | 13.1/all |

Where TGA is thioglycolic acid. Sufficient sodium hydroxide was used to give the dianion.

Macroporous beads were used for 1–4, gel type for 5–9.

Dioxane was used as the swelling agent/solvent (10:1 v/w)

TABLE 2

Summary Of Ion Exchange Properties Of Results Double Reacted Resins Based On Chloromethylated Crosslinked Polystyrene

| Resin No. | R'CO$_2$H Sites meq/g | R$_3$NHCl Sites, meq/g | Ratio base sits | Salt Uptake at pH 5.5 meq/g |
| --- | --- | --- | --- | --- |
| 1 | 2.46 | 0.48 | 5.1 | 0.20 |
| 2 | 0.80 | 0.96 | 0.83 | 0.04 |
| 3 | 0.20 | 1.58 | 0.13 | 0.03 |
| 4 | 0.85 | 0.60 | 1.41 | 0.05 |
| 5 | 0.85 | 1.38 | 0.62 | 0.17 |
| 6 | 1.24 | 1.66 | 0.75 | 0.23 |
| 7 | 3.63 | 0.22 | 17 | — |
| 8 | 0.86 | 2.10 | 0.41 | 0.10 |
| 9 | 1.06 | 1.78 | 0.60 | 0.13 |

EXAMPLE 2

Polyvinylidine chloride particles were reacted with thioglycolic acid under alkaline conditions by stirring the particles (3.1 g) in a solution of sodium hydroxide (10.7 g) and thioglycolic acid (8.8 ml) in water (10.7 ml) and pyridine (4.0 ml) at 70°–75° C. for 47 hr. The particles were then washed on the filter with water.

The acidic resin was aminated with tetramethylenediamine by stirring the particles (2.0 g) with the amine (4.9 g) in dimethyl sulphoxide (6.9 g) at 75° C. for 24 hr. The product was washed with hot methanol, and stirred in 2N hydrochloric acid overnight. It was further washed with acid in a column and this was followed with water washing. The resin was found to contain 2.70 meq/g of carboxylic acid groups, and 0.70 meq/g of amine hydrochloride groups. The acid/base site ratio was 3.9.

EXAMPLE 3

Polyvinylidine chloride particles were aminated with hexamethylenediamine by adding the particles (1.0 g) to the amine (6.4 g) in water (1.5 g) and stirring for 1 hr at 70° C. plus 3 hr at 98° C. The particles were filtered off and column washed with 2 N hydrochlorice acid, 0.3N sodium hydroxide, and water.

The aminated polymer (0.5 g) was reacted with thioglycolic acid (4.4 ml) and sodium hydroxide (5.4 g) in water (5.4 ml) and dimethylformamide (1.0 ml). The mixture was stirred at 70° C. for 23 hr, and the resin filtered off, stirred in 0.1N sodium hydroxide overnight, and column washed with 2N hydrochloric acid and water. The product contained 1.11 meq/g of carboxylic acid groups, and 1.56 meq/g of amine hydrochloride groups, to give an acid to base site ratio of 0.7.

EXAMPLE 4

Polyvinyl chloride particles were aminated with hexamethylenediamine by stirring the polymer (3.8 g) and amine (38.7 g) in water (9.1 ml) on a boiling water bath for 12 hr. The particles, after separation, were washed with 2N hydrochloric acid, 0.3N sodium hydroxide, and water.

The aminated particles (1.0 g) were treated by stirring with thioglycolic acid (4.4 ml) and sodium hydroxide (5.4 g) in water (5.4 ml) and dimethylformamide (2.0 ml) at 70° C. for 6 days. After filtering them off, they were column washed with hydrochloric acid and water in the usual way. The concentration of carboxylic acid groups in the product resin was 1.34 meq/g, and of amine hydrochloride groups 1.96 meq/g. The acid/base site ratio was 0.7.

EXAMPLE 5

Polyvinyl chloride particles were aminated with hexamethylenediamine as in Example 4 and reacted with thioglycolic acid by stirring the free base form of the aminated polymer (0.66 g) with the acid (4.4 ml) and sodium hydroxide (5.4 g) in water (5.4 ml) and pyridine (2.0 ml) at 75° C. for 113 hr. The particles were then stirred in 0.1N sodium hydroxide for 3 hr. and column washed with 2N hydrochloric acid and water.

The product contained 0.96 meq/g of carboxylic acid groups and 2.27 meq/g of amine hydrochloride groups, to give an acid to base site ratio of 0.4.

We claim:

1. A process of manufacturing an amphoteric resin wherein the ratio of acidic groups to basic groups can be controlled, which process comprises treating polymeric beads sequentially with two reagents of opposing acid base character, wherein said beads comprise polymers and copolymers selected from the group consisting of chloromethylated polystyrene, polyvinyl chloride, polyvinylidene chloride, chlorinated polyethylene, chlorinated rubbers, polyvinyl alcohol and polysaccharides, and wherein said reagents are reactable with said beads and are selected from the group consisting of thioglycolic, acid, thiolactic acid, thiomalic acid, thiosalicylic acid, and their analogous hydroxy acids, chloroacetic acid, 2-chloropropionic acid, 3-chlorobutyric acid, and their analogous bromo acids, and primary and secondary amines of the alkyl and aralkyl type, polyamines and derivatives thereof in which one amino group is in the primary and secondary form, with the others in primary, secondary or tertiary form, analogous cyclic diamines, 2-aminoethanethiol, 2-alkylaminoethanethiol, 2-dialkylaminoethanethiol, 2-aminoethylchloride, 2-alkylaminoethyl chloride, 2-dialkylaminoethyl chlorides, and α-ω-amino acids.

2. A process according to claim 1 wherein the ratio of basic groups to acidic groups is in the range of 1:9 to 9:1.

3. A process according to claim 1 wherein the ratio of basic groups to acidic groups is in the range of 1:4 to 3:2.

4. A process according to claim 1 wherein the polymer is chloromethylated polystyrene crosslinked with divinylbenzene, and wherein the reagent of acid character is thioglycollic acid and the reagent of base character is selected from the group consisting of methylamine, dimethylamine and diethylamine.

5. A process according to claim 1 wherein the polymer is polyvinylidine chloride, and wherein the reagent of acid character is thioglycollic acid and the reagent of base character is selected from the group consisting of hexamethylenediamine and tetramethylenediamine.

6. A process according to claim 1 wherein the polymer is polyvinyl chloride, and wherein the reagent of acid character is thioglycollic acid and the reagent of base character is hexamethylenediamine.

* * * * *